United States Patent
Ota et al.

(10) Patent No.: US 8,558,691 B2
(45) Date of Patent: Oct. 15, 2013

(54) SENSING APPARATUS, SENSOR INFORMATION GATHERING APPARATUS, SENSING METHOD, AND REMOTE SENSING METHOD

(75) Inventors: Yasuji Ota, Kawasaki (JP); Masanao Suzuki, Kawasaki (JP); Masakiyo Tanaka, Kawasaki (JP); Taro Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 978 days.

(21) Appl. No.: 12/457,546

(22) Filed: Jun. 15, 2009

(65) Prior Publication Data

US 2009/0256705 A1    Oct. 15, 2009

Related U.S. Application Data

(63) Continuation of application No. PCT/JP2007/055278, filed on Mar. 15, 2007.

(51) Int. Cl.
*G08B 1/08* (2006.01)

(52) U.S. Cl.
USPC ............. 340/539.12; 340/573.1; 340/692

(58) Field of Classification Search
USPC ............. 340/573.1, 531, 539.1, 691.1, 692, 340/539.12; 379/37, 38, 88.01, 88.13
See application file for complete search history.

(56) References Cited

FOREIGN PATENT DOCUMENTS

| JP | 5-101291 | 4/1993 |
|---|---|---|
| JP | 6-86152 | 12/1994 |
| JP | 7-34343 | 8/1995 |
| JP | 11-353399 | 12/1999 |
| JP | 2002-310642 A | 10/2002 |
| JP | 2002-351927 | 12/2002 |
| JP | 2003-168181 | 6/2003 |
| JP | 2003-526274 | 9/2003 |
| WO | 01/67671 A2 | 9/2001 |

OTHER PUBLICATIONS

Japanese Notice of Reason(s) for Rejection mailed Feb. 14, 2012 issued in corresponding Japanese Patent Application No. 2009-503869.
International Search Report (Form PCT/ISA/210) for International Application No. PCT/JP2007/055278, mailed Jun. 19, 2007.
Partial English translation of Japanese Patent Publication 5-101291.
Chinese Office Action issued Dec. 10, 2010 in corresponding Chinese Patent Application 200780052034.3.

*Primary Examiner* — Thomas Mullen
(74) *Attorney, Agent, or Firm* — Staas & Halsey LLP

(57) ABSTRACT

A sensing apparatus which controls the detection timing of a sensor by a prescribed guidance signal includes a guidance signal analyzing unit for analyzing the prescribed guidance signal, and a sensing control unit for determining, based on the result of the detection, an effective detection period during which an output of the sensor is effective.

15 Claims, 9 Drawing Sheets

SENSING APPARATUS, SENSOR
INFORMATION GATHERING APPARATUS,
SENSING METHOD, AND REMOTE SENSING
METHOD

CROSS REFERENCE TO RELATED
APPLICATION

The present application is a continuation application based on International application No. PCT/JP2007/055278, filed on Mar. 15, 2007.

FIELD

The embodiment(s) discussed herein is (are) related to remote sensing techniques for receiving remotely detected sensor information via a communication line.

BACKGROUND

FIG. 1 is a diagram schematically illustrating the configuration of a prior art remote sensing system. The remote sensing system 200 includes a client apparatus (terminal) C, a server apparatus S installed at a location remote from the client apparatus C, and a public communication network NT which is a digital network or the like for interconnecting these apparatuses via an electrical communication line.

Server apparatus S transmits a sensor control signal for controlling sensors 1 to 3 to client apparatus C which, based on the sensor control signal, controls sensors 1 to 3 to perform the sensing of target objects. Sensor information acquired by sensors 1 to 3 is transmitted from client apparatus C via a public communication network NT to server apparatus S where the information is stored or made available for use.

Patent document 1 mentioned below discloses a sensor information network system in which measurement data acquired by a mobile terminal or a specified measuring device is recorded along with geographic location information of that mobile terminal or measuring device.

On the other hand, patent document 2 mentioned below discloses an account settling apparatus, equipped with a voice response function, that transmits settlement-related information by embedding it in a voice signal in a voice communication between the account settling apparatus and a telephone terminal.

Further, patent document 3 mentioned below discloses a method of embedding supplemental data in a digital phone signal without affecting backward compatibility of the digital phone signal, through transforming the digital voice phone signal into encoded sets of frequency-domain or other transform coefficient representations of the signal.

Patent document 1: Japanese Unexamined Patent Publication No. 2002-351927
Patent document 2: Japanese Unexamined Patent Publication H11-353399
Patent document 1: Japanese Unexamined Patent Publication No. 2003-526274

SUMMARY

According to an embodiment, there is provided a sensing apparatus which controls detection timing of a sensor by a prescribed guidance signal. The sensing apparatus includes a guidance signal analyzing unit which analyzes the prescribed guidance signal, and a sensing control unit which determines, based on the result of the analysis, an effective detection period during which the detection of the sensor is effective.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT(S)

Figure 2:
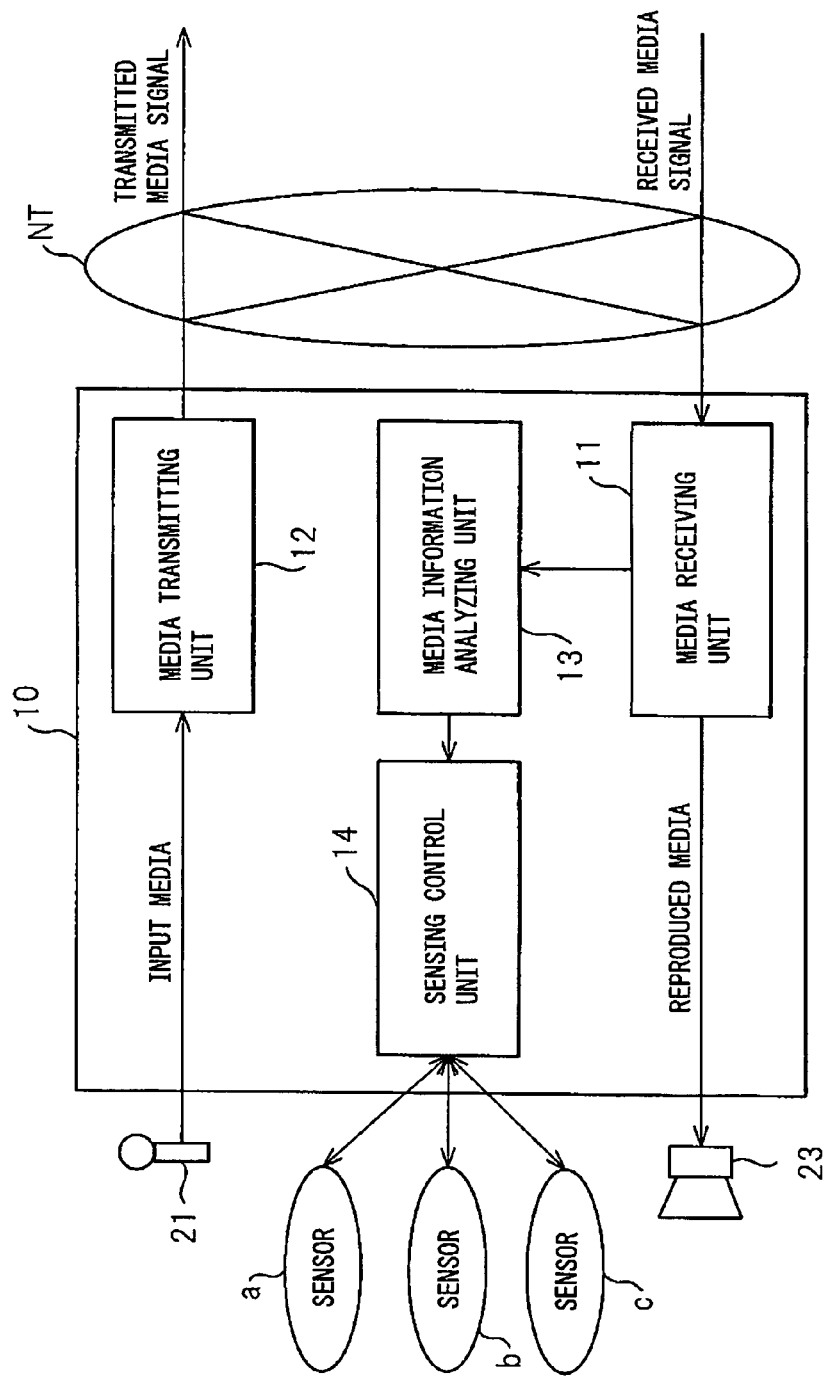
FIG. 2 is a diagram illustrating a configuration example of a media transmitting-receiving apparatus as an embodiment of a sensing apparatus.

First, the embodiments will be described with reference to the accompanying drawings. FIG. 2 is a diagram illustrating a configuration example of a media transmitting-receiving apparatus as an embodiment of a sensing apparatus.

The media transmitting-receiving apparatus 10 is an apparatus that transmits and receive media signals, such as voice signals or video signals, via a digital communication network NT, and includes a media receiving unit 11 that receives a media signal from the digital communication network NT and a media transmitting unit 12 that transmits a media signal onto the digital communication network NT.

A media signal reproducing unit 23 is connected to the media receiving unit 11 and reproduces the received media signal. The media signal reproducing unit 23 may be implemented using, for example, a speaker unit that reproduces a voice signal contained in the media signal or a display unit that reproduces a video signal contained in the media signal.

On the other hand, a media signal input unit 21 is connected to the media transmitting unit 12, and acquires the media signal to be transmitted out by the media transmitting unit 12. The media signal input unit 21 may be implemented using, for example, a microphone for capturing a voice signal to be included in the media signal or an imaging unit that captures a video signal to be included in the media signal.

The media transmitting-receiving apparatus 10 also includes a plurality of sensors a to c, and the user of the media transmitting-receiving apparatus 10 can measure desired physical quantities by using these sensors a to c. The target to be sensed by the sensors a to c may be the user himself. For example, when the media transmitting-receiving apparatus 10 is a client terminal used for remote medical diagnosis, the plurality of sensors a to c may be a clinical thermometer for measuring the user's body temperature, a sphygmomanometer for measuring the user's blood pressure, a cardiophone for sampling the user's cardiac sound, or the like.

The media signal received by the media receiving unit 11 and reproduced by the media signal reproducing unit 23 is used to provide guidance to the user about the detection timing of the sensors a to c. For example, when the media signal contains a voice signal, the voice signal may carry a voice uttering a keyword (for example, "Here goes") or a sound having a specific feature (for example, a sound having a specific frequency) that indicates the start and end of the sensor detection period, or a sound having a specific feature that indicates the sensor detection period (for example, a sound having a specific frequency or a muted sound that lasts only during the detection period). Accordingly, the media signal received by the media receiving unit 11 corresponds to the prescribed guidance signal described in the appended claims.

The media transmitting-receiving apparatus 10 includes a media information analyzing unit 13 that analyzes the media signal and detecting the kind and amount of the feature of the voice signal contained in the media signal, and a sensing control unit 14 that identifies, based on the detection result from the media information analyzing unit 13, the timing with which to perform the sensing by the respective sensors a to c, and determines an effective detection period which is a period during which each designated one of the sensors a to c produces an output effective for detection.

Figure 1:
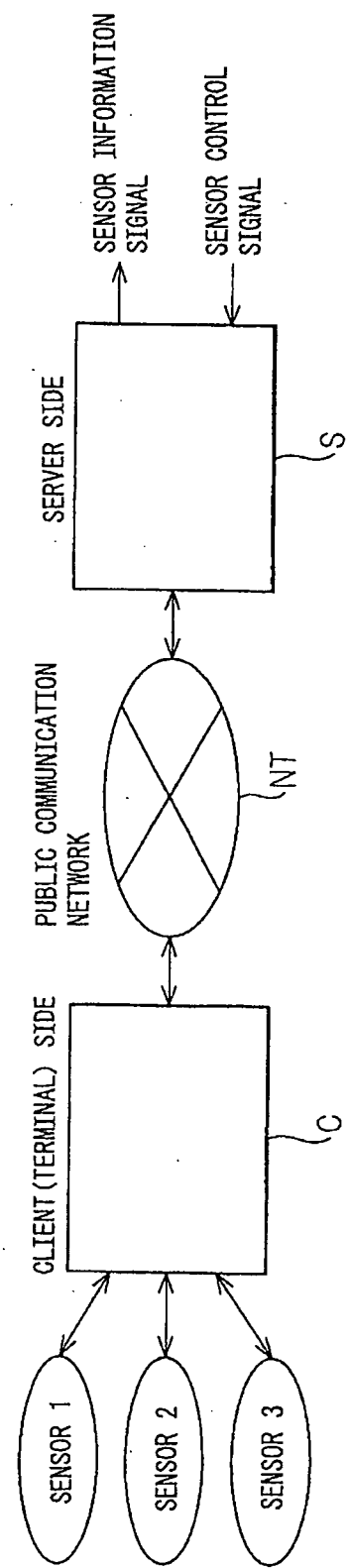
FIG. 1 is a diagram schematically illustrating the configuration of a prior art remote sensing system.
Figure 3:
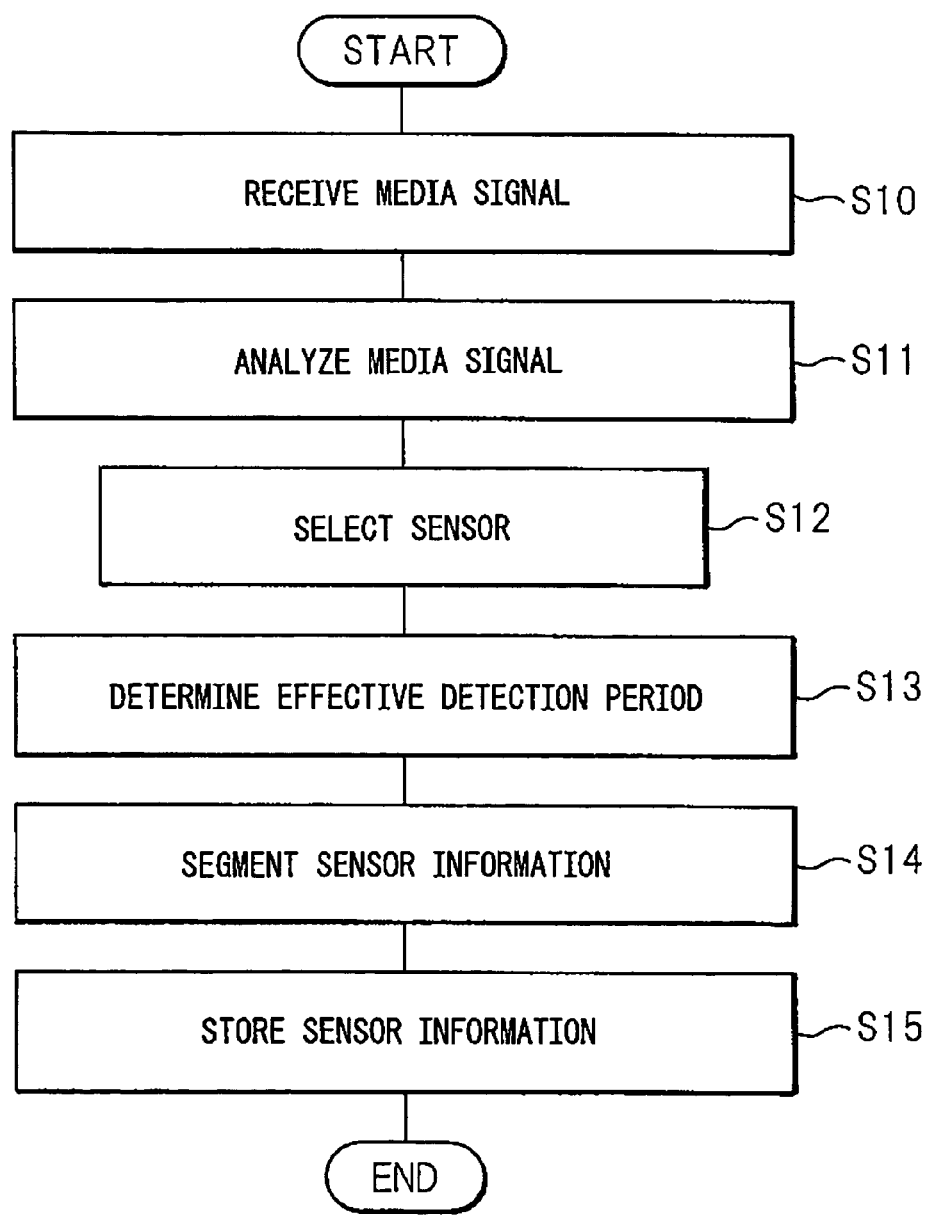
FIG. 3 is a flowchart illustrating the processing performed by the media transmitting-receiving apparatus depicted in FIG. 2.

FIG. 3 is a flowchart illustrating the processing performed by the media transmitting-receiving apparatus 10 depicted in FIG. 2. In step S10, the media receiving unit 11 receives a media signal from a predesignated apparatus, such as the server apparatus S depicted in FIG. 1, connected to the digital communication network NT. This medial media signal contains a message signal that provides guidance to the user about the detection timing of the respective sensors a to c.

Figure 4:
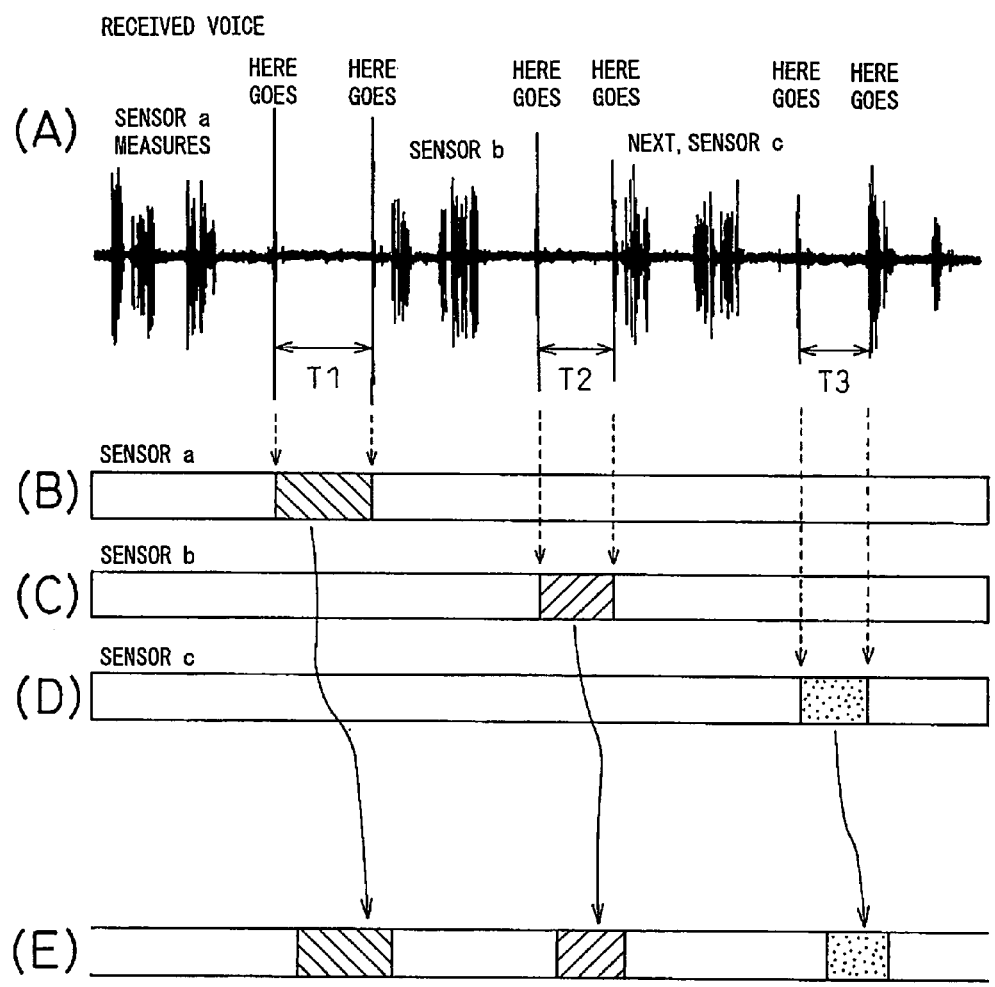
FIG. 4 is an explanatory diagram illustrating a sensing method according to the embodiment.

FIG. 4(A) illustrates an example of the media signal. In the illustrated example, the media signal contains a voice signal produced by recording or synthesizing a voice keyword "Here goes" and is used to indicate the start timing and end timing of the sensor detection period. The detection period is preceded by a voice signal (for example, "sensor a") as supplemental information for identifying the sensor to be used for sensing. The media receiving unit 11 supplies the received media signal to the media information analyzing unit 13 as well as to the media signal reproducing unit 23 that reproduces the media signal.

In step S11, the media information analyzing unit 13 analyzes the media signal and detects the kind and amount of the feature that the voice signal contained in the media signal has.

For example, when the voice signal contained in the media signal is one that indicates the start timing and end timing of the sensor detection period by producing a prescribed keyword "Here goes" this prescribed keyword is detected using a word spotting technique.

On the other hand, when the voice signal contained in the media signal indicates the sensor detection period by producing, for example, a muted sound that lasts longer than a predetermined threshold value, the length of the mute period is detected by detecting the muted sound and monitoring the length of time.

Further, when the voice signal contained in the media signal includes a voice signal that indicates the identifier of the sensor to be used for sensing, by producing, for example, a prescribed keyword such as "sensor a," "sensor b," etc., this prescribed keyword is detected using a word spotting technique.

Each time the voice signal having a specific feature is detected in the media signal, the media information analyzing unit 13 reports the kind and amount of the feature to the sensing control unit 14.

In step S12, based on the result of the media signal analysis by the media information analyzing unit 13, the sensing control unit 14 selects the sensor to be used for sensing from among the plurality of sensors a to C.

In step S13, based on the result of the media signal analysis by the media information analyzing unit 13, the sensing control unit 14 determines the effective detection period, i.e., the period during which the selected one of the sensors a to c produces an output effective for detection. For example, when the voice signal contained in the media signal is one that indicates the start timing and end timing of the sensor detection period by producing the prescribed keyword "Here goes" the sensing control unit 14 determines the effective detection period by taking the period sandwiched between two successive time instants at which the keyword was detected by the media information analyzing unit 13. On the other hand, when the voice signal contained in the media signal indicates the sensor detection period by producing, for example, a muted sound that lasts longer than a predetermined threshold value, the sensing control unit 14 determines the effective detection period by taking the mute period detected by the media information analyzing unit 13.

In step S14, the sensing control unit 14 segments out data during the effective detection period determined in step S13 from the signal (sensor information) output from the sensor selected in step S12 for each sensing operation.

For example, FIG. 4(B) illustrates how the sensor a is selected as the sensor to be used for sensing, by detecting the keyword "sensor a" produced by the voice signal contained in the media signal of FIG. 4(A), and how the sensor information output from the sensor a during the effective detection period is thereafter segmented out by detecting the keyword "Here goes" twice.

Likewise, FIG. 4(C) illustrates how the sensor b is selected as the sensor to be used for sensing, by detecting the keyword "sensor b" produced by the voice signal contained in the media signal of FIG. 4(A), and how the sensor information output from the sensor b during the effective detection period is thereafter segmented out by detecting the keyword "Here goes" twice.

FIG. 4(D) illustrates how the sensor c is selected as the sensor to be used for sensing by detecting the keyword "sensor c" produced by the voice signal contained in the media signal of FIG. 4(A), and how the sensor information output from the sensor c during the effective detection period is thereafter segmented out by detecting the keyword "Here goes" twice.

In step S15, the sensing control unit 14 stores the sensor information, segmented out in step S14 from the sensor information acquired from the respective sensors a to c, into a prescribed storage means (not depicted) provided within the media transmitting-receiving apparatus 10. The sensing control unit 14 may store the sensor information by appending supplemental information such as the identifier of the sensor used and the time of the detection.

Further, in step S11, when the media analyzing unit 13 detects the voice signal having a specific feature that indicates the start timing and end timing of the sensor detection period, the processing for detecting the voice signal and the processing for reporting the detection result to the sensing control unit 14 may be performed in real time, i.e., at the same time that the voice signal is reproduced by the media signal reproducing unit 23.

Or, in step S11, when the media analyzing unit 13 reports to the sensing control unit 14 the detection result of the voice signal indicating the start timing and end timing of the sensor detection period, the time of the detection of the voice signal may also be reported at the same time. Then, based on the time of the detection, the sensing control unit 14 may calculate the time at which the voice signal is expected to be reproduced by the media signal reproducing unit 23, and may determine the effective detection period based on this expected time.

Figure 5:
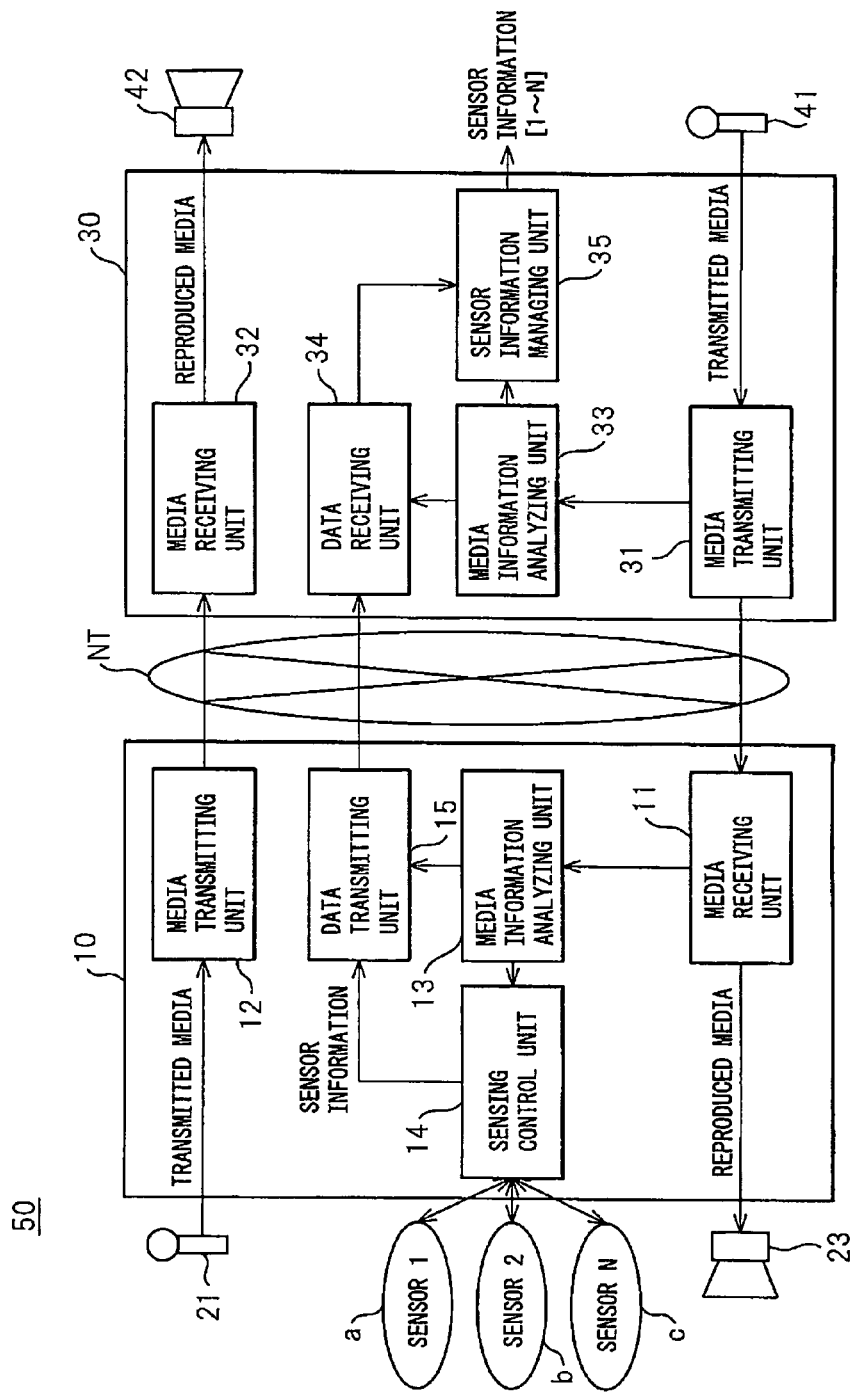
FIG. 5 is a diagram illustrating a first configuration example of a remote sensing system according to an embodiment.

FIG. 5 is a diagram illustrating a first configuration example of a remote sensing system according to an embodiment. The remote sensing system 50 includes a media transmitting-receiving apparatus 10, a digital communication network NT, and a sensor information gathering server 30 that gathers sensor information from the media transmitting-receiving apparatus 10 via the digital communication network NT. The media transmitting-receiving apparatus 10 depicted in FIG. 5 is identical in configuration to the media transmitting-receiving apparatus depicted in FIG. 2; therefore, component elements having the same functions are designated by the same reference numerals, and the description thereof will not be repeated here.

The sensor information gathering server 30 transmits via the digital communication network NT to the media transmitting-receiving apparatus 10 a media signal for providing guidance to the user about the detection timing of the respective sensors a to c.

The sensor information gathering server 30 includes a media transmitting unit 31 that transmits a media signal via the digital communication network NT to the media transmitting-receiving apparatus 10, a media receiving unit 32 that receives a media signal from the media transmitting-receiving apparatus 10 via the digital communication network NT, a media signal input unit 41 connected to the media transmitting unit 31, and a media signal reproducing unit 42 connected to the media receiving unit 32.

The media transmitting-receiving apparatus 10 includes a data transmitting unit 15 that transmits the sensor information acquired by the respective sensors a to c to the sensor information gathering server 30 via the digital communication network NT; on the other hand, the sensor information gathering server 30 includes a data receiving unit 34 that receives the sensor information transmitted from the data transmitting unit 15 in the media transmitting-receiving apparatus 10.

Figure 6:
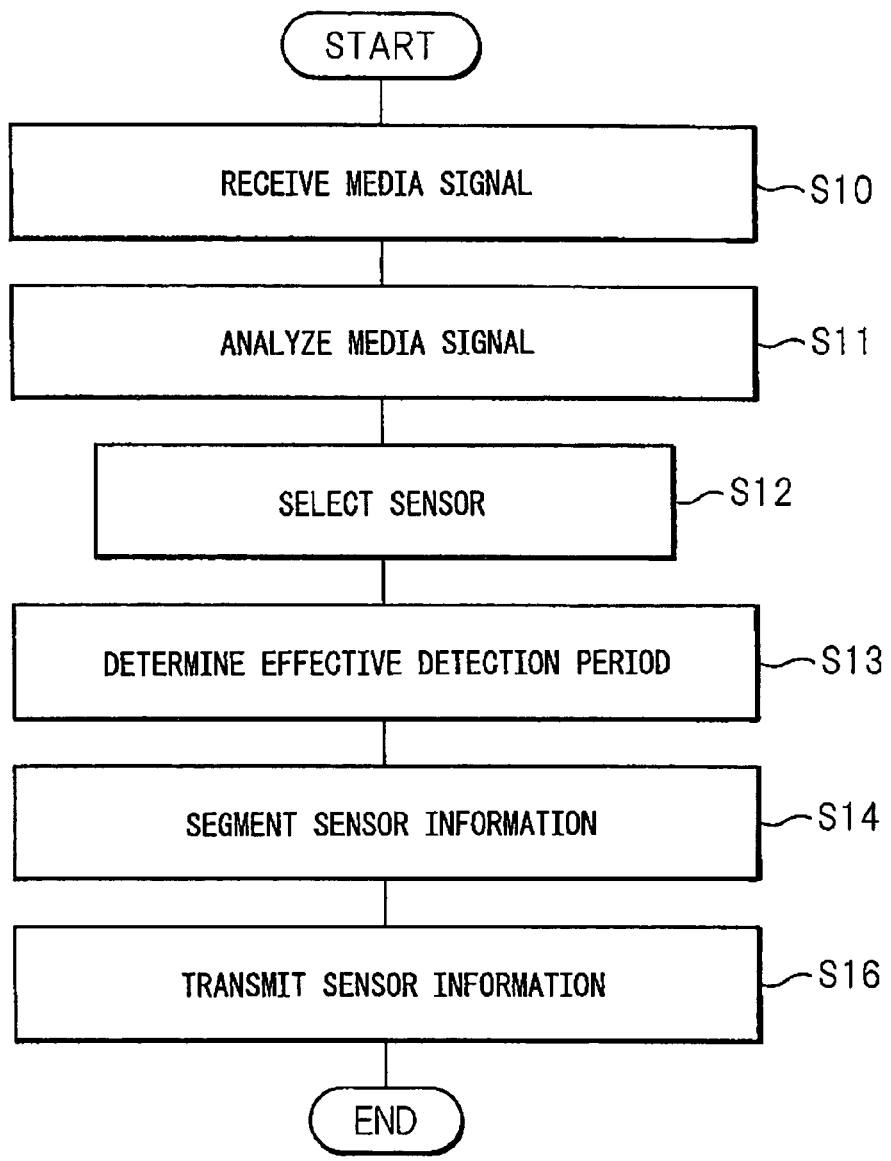
FIG. 6 is a flowchart illustrating the processing performed by the media transmitting-receiving apparatus depicted in FIG. 5.

FIG. 6 is a flowchart illustrating the processing performed by the media transmitting-receiving apparatus 10 depicted in FIG. 5. Steps S10 to S14 in the flowchart of FIG. 6 are the same as the corresponding steps in the flowchart of FIG. 3, except that the media signal in step S10 is received from the sensor information gathering server 30; therefore, the description of these steps will not be repeated here.

In step S16, the sensing control unit 14 passes the sensor information, segmented out in step S14 from the sensor information acquired from the respective sensors a to c, to the data transmitting unit 15. The data transmitting unit 15 transmits the sensor information to the sensor information gathering server 30.

FIG. 4(E) illustrates an example of the transmitted data. The sensing control unit 14 passes the segmented pieces of sensor information as a series of data to the data transmitting unit 15 by arranging them in time order that matches the order in which the sensing operations were performed. For example, when the media information analyzing unit 13 has detected from the media signal the respective voice signals each indicating the detection period for sensing, the sensing control unit 14 arranges the sensor information acquired from the sensing operations performed in response to the respective voice signals, in the same order in which the respective voice signals were detected; by so doing, the segmented pieces of sensor information can be arranged in the order in which the sensing operations were performed.

Preferably, the sensing control unit 14 passes the segmented pieces of sensor information to the data transmitting unit 15 while maintaining the relative time difference between the respective sensing operations. For example, when each voice signal indicating the detection period for sensing is detected from the media signal, the media information analyzing unit 13 supplies the time of that detection to the sensing control unit 14. Then, by scheduling in accordance with the time of the detection of the voice signal the transmit timing of the sensor information acquired from the sensing operation performed in response to the voice signal, the sensing control unit 14 maintains the time difference between the respective sensing operations at substantially the same value as the time difference between the transmission times of the segmented pieces of sensor information.

For each piece of sensor information to be transmitted out from the data transmitting unit 15, the media information analyzing unit 13 may supply to the data transmitting unit 15 supplemental information such as the identifier of the sensor used and the time at which the voice signal indicating the detection period for sensing was detected from the media signal. The data transmitting unit 15 transmits the supplemental information to the sensor information gathering server 30 by appending it to the sensor information.

When managing the sensor information, the sensor information gathering server 30 uses the supplemental information to identify from which sensor the sensor information was acquired and how it was acquired.

Such supplemental information, for example, the identifier of the sensor used for sensing, may be acquired at the sensor information gathering server 30 side. For this purpose, the sensor information gathering server 30 depicted in FIG. 5 includes a media information analyzing unit 33 that analyzes the media signal to be transmitted by the media transmitting unit 31 and detecting the kind and amount of the feature of the voice signal contained as supplemental information in the media signal, and a sensor information managing unit 35 that determines association between the supplemental information identified by the detection result from the media information analyzing unit 33 and the sensor information received by the data receiving unit 34, and manages the sensor information by using this supplemental information.

Figure 7:
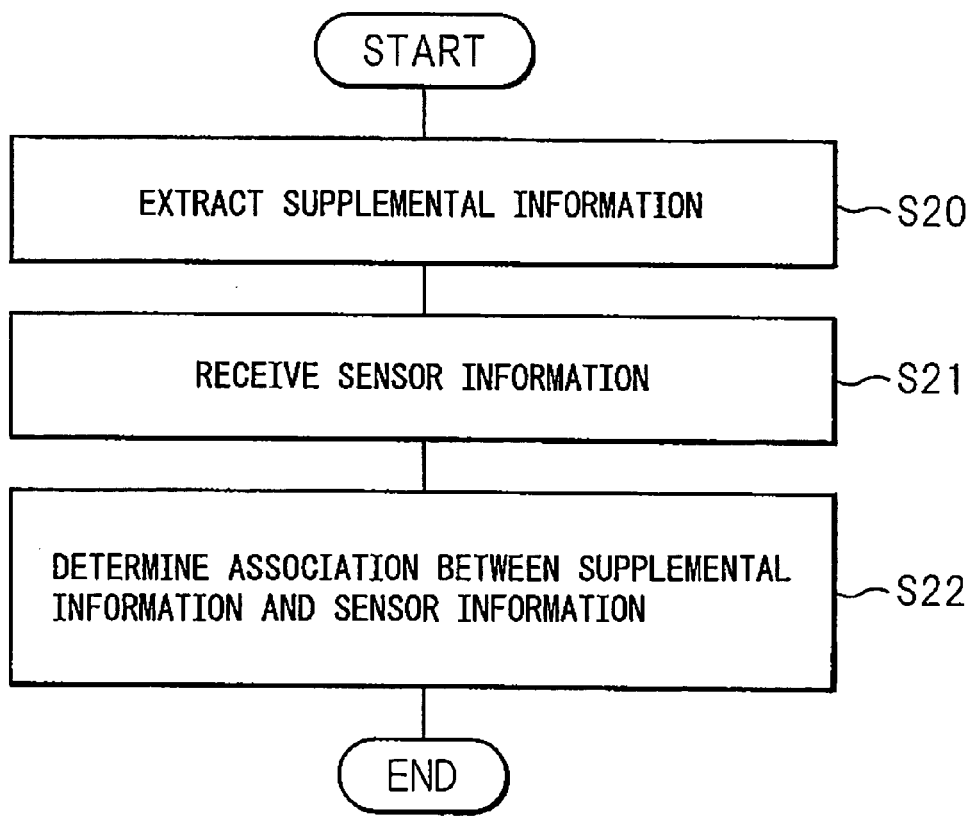
FIG. 7 is a flowchart illustrating the processing performed by a server apparatus depicted in FIG. 5.

FIG. 7 is a flowchart illustrating the processing performed by the sensor information gathering server 30 depicted in FIG. 5.

In step S20, the media information analyzing unit 33 extracts the supplemental information by analyzing the media signal that the media transmitting unit 31 transmits to the media transmitting-receiving apparatus 10 and by detecting the kind and amount of the feature of the voice signal contained as the supplemental information in the media signal. For example, the media information analyzing unit 33 identifies the sensor to be used for sensing, by detecting using a word spotting technique the voice signal that produces the prescribed keyword "sensor a," "sensor b," etc., to indicate the identifier of the sensor to be used for sensing.

In step S21, the data receiving unit 34 receives the sensor information segmented out by the sensing control unit 14 and transmitted from the data transmitting unit 15 in the media transmitting-receiving apparatus 10.

In step S22, the sensor information managing unit 35 receives the sensor information from the data receiving unit 34 and the supplemental information from the media information analyzing unit 33. Then, it determines the association between the sensor information and the supplemental information, and outputs the sensor information and the supplemental information thus associated with each other.

For example, the sensor information managing unit 35 associates the sensor information with the supplemental information that indicates the identifier of the sensor used for acquiring the sensor information. In this case, the order in which the media information analyzing unit 33 detects the respective sensor identifiers matches the order in which the sensing is performed using the respective sensors, and the media transmitting-receiving apparatus 10 transmits the sensor information acquired from the respective sensors in the same order as the order of the sensing, as earlier described. Since the order in which the supplemental information indicating the identifier of the sensor matches the order in which the sensor information acquired from the sensor was received, the sensor information managing unit 35 can easily determine the association between the sensor information and the supplemental information.

In the configuration example depicted in FIG. 5, the media transmitting-receiving apparatus 10 has been described as acquiring the sensor identifier for identifying the sensor to be used for sensing from the media information transmitted from the sensor information gathering server apparatus 30.

In an alternative configuration example, the information for identifying the sensor to be used for sensing may be transmitted from the sensor information gathering server apparatus 30 to the media transmitting-receiving apparatus 10 by using a signal other than the media signal, thereby simplifying the media information analysis task in the media transmitting-receiving apparatus 10. However, in this case the effective detection period for sensing is determined based on the analysis result of the media information in order to synchronize the effective detection period to the reproduction timing of the media information. A remote sensing system implementing such a configuration example is depicted in FIG. 8.

Figure 8:
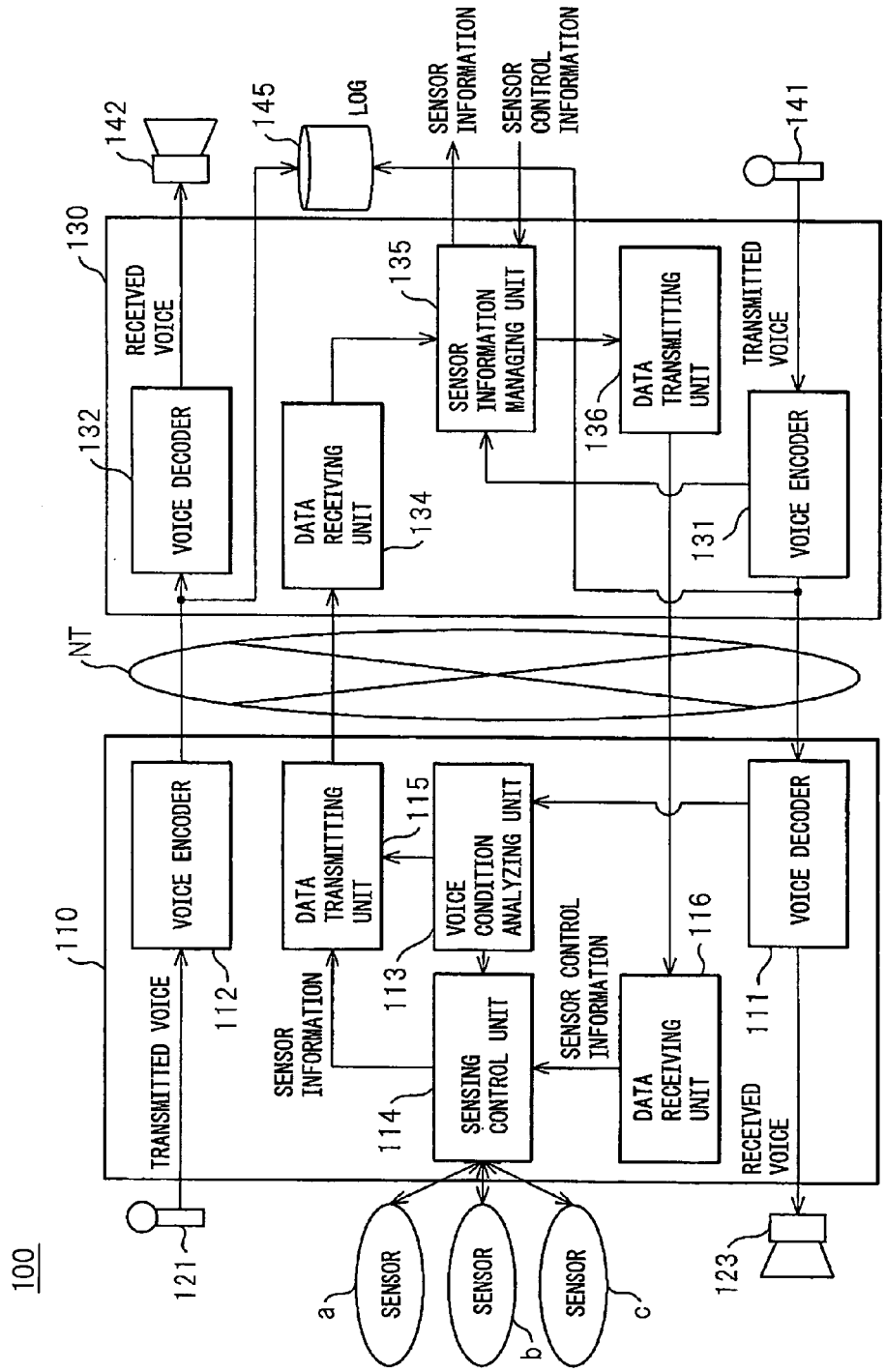
FIG. 8 is a diagram illustrating a second configuration example of a remote sensing system according to an embodiment.

The remote sensing system 100 depicted in FIG. 8 uses a voice signal as the media information. The remote sensing system 100 includes a media transmitting-receiving apparatus 110, a digital communication network NT, and a sensor information gathering server 130 which gathers sensor information from the media transmitting-receiving apparatus 110 via the digital communication network NT.

The media transmitting-receiving apparatus 110 includes a voice decoder 111 that decodes the voice signal received from the sensor information gathering server 130 via the digital communication network NT, a voice encoder 112 that encodes the voice signal to be transmitted to the sensor information gathering server 130 via the digital communication network NT, a voice signal reproducing unit 123 connected to the voice decoder 111, a voice signal input unit 121 connected to the voice encoder 112, and sensors a to c for sensing desired physical quantities.

The media transmitting-receiving apparatus 110 further includes a voice condition analyzing unit 113 that analyzes the voice signal received from the sensor information gathering server 130 and detecting the kind and amount of the feature contained in the voice signal, and a sensing control unit 114 that identifies, based on the detection result from the voice condition analyzing unit 113, the timing with which to perform the sensing by the respective sensors a to c, and determines an effective detection period which is a period during which each designated one of the sensors a to c produces an output effective for detection.

The processing for analyzing the voice signal by the voice condition analyzing unit 113 is the same as the processing for analyzing the media information earlier described with reference to FIG. 2, and the processing for determining the effective detection period by the sensing control unit 114 is the same as the processing for determining the effective detection period by the sensing control unit 14 earlier described with reference to FIG. 2; therefore, the description of their processing will not be repeated here.

The media transmitting-receiving apparatus 110 further includes a data receiving unit 116 that receives from the sensor information gathering server 130 sensor control information for identifying the sensor to be used for sensing. Using this sensor control information, the sensing control unit 114 selects the sensor whose sensor information is to be acquired, and segments out data during the effective detection period from the sensor information acquired from the selected sensor. The thus segmented data is transmitted from the data transmitting unit 115 to the sensor information gathering server 130. In this case, for each piece of sensor information to be transmitted out from the data transmitting unit 115, supplemental information such as the time at which the keyword indicating the detection period for sensing was detected from the voice signal may be supplied from the voice condition analyzing unit 113 to the data transmitting unit 115. The data transmitting unit 115 transmits the supplemental information to the sensor information gathering server 130 by appending it to the sensor information.

The sensing control unit 114 passes the segmented pieces of sensor information as a series of data to the data transmitting unit 115 by arranging them in time order that matches the order in which the sensing operations were performed. Preferably, the sensing control unit 114 passes the segmented pieces of sensor information to the data transmitting unit 115 while maintaining the relative time difference between the respective sensing operations. These processing operations are the same as those performed in the media transmitting-receiving apparatus 10 previously described with reference to FIG. 5.

The sensor information gathering server 130 includes a voice encoder 131 that encodes the voice signal to be transmitted to the media transmitting-receiving apparatus 110 via the digital communication network NT, a voice decoder 132 that decodes the voice signal received from the media transmitting-receiving apparatus 110 via the digital communication network NT, a voice signal reproducing unit 142 connected to the voice decoder 132, a voice signal input unit 141 connected to the voice encoder 131, and a storage unit 145 in which a log of the voice signals transmitted and received to and from the media transmitting-receiving apparatus 110 is stored.

The sensor information gathering server 130 further includes a data transmitting unit 136 that transmits the sensor control information for identifying the sensor to be used for sensing to the media transmitting-receiving apparatus 110 after receiving the sensor control information via a sensor information managing unit 135 described hereinafter, a data receiving unit 134 that receives the sensor information transmitted from the media transmitting-receiving apparatus 110, and the sensor information managing unit 135 that determines association between the sensor information and the sensor control information, and outputs the sensor information and the sensor control information thus associated with each other. The sensor information gathering server 130 may include a storage means (not depicted) in which storing the sensor information and the sensor control information thus associated with each other are stored.

The processing for associating the sensor information with the sensor control information by the sensor information managing unit 135 is the same as the processing for associating the sensor information with the supplemental information by the sensor information managing unit 35 depicted in FIG. 5.

The sensor information may be embedded in the media information such as voice information transmitted from the media transmitting-receiving apparatus to the sensor information gathering server. By embedding the sensor information into other data for transmission, highly secure transmission of the information can be achieved by concealing the presence of the sensor information.

Figure 9:
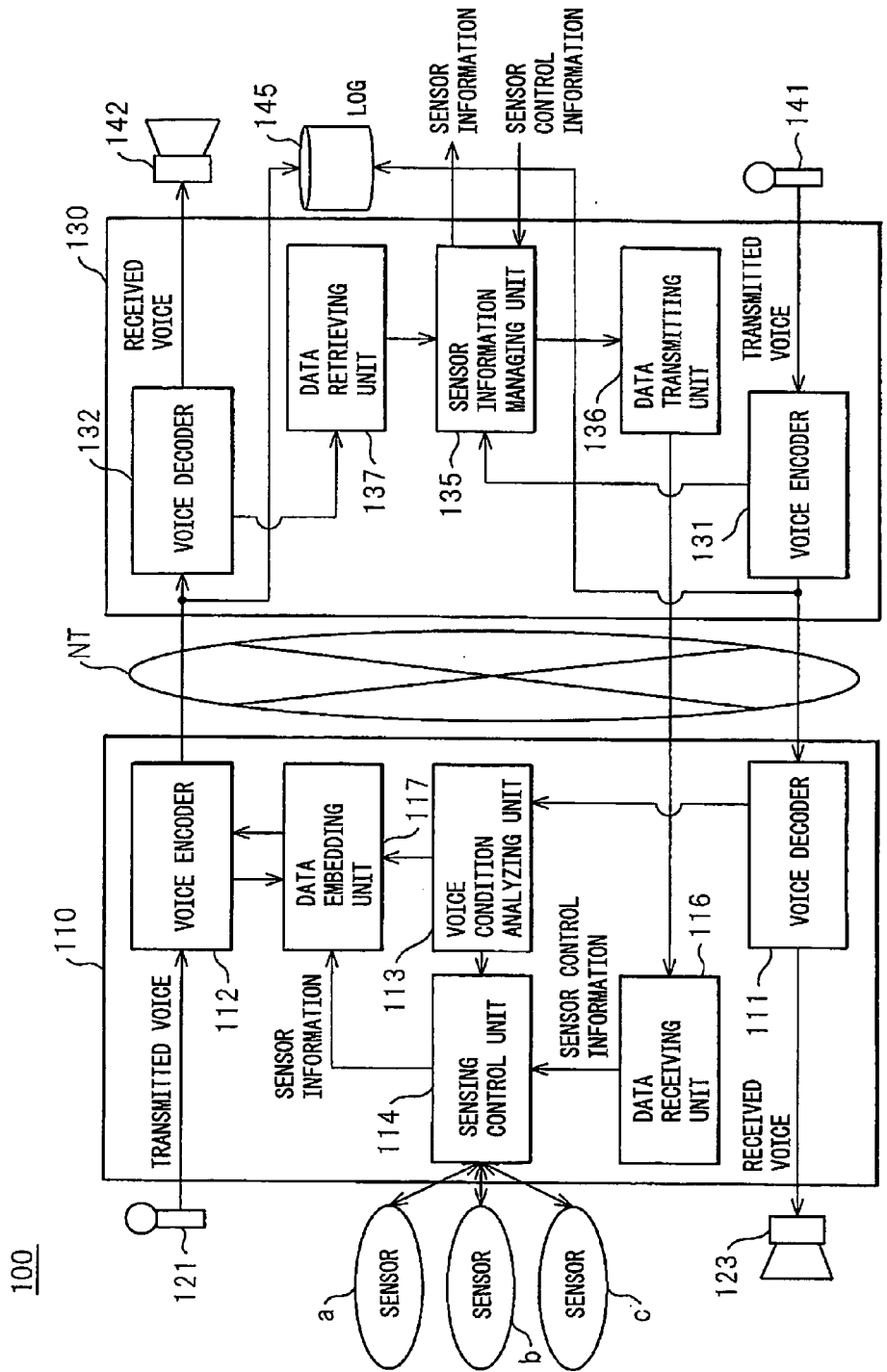
FIG. 9 is a diagram illustrating a third configuration example of a remote sensing system according to an embodiment.

FIG. 9 is a diagram illustrating a third configuration example of a remote sensing system according to an embodiment. The remote sensing system depicted in FIG. 9 is similar in configuration to the remote sensing system depicted in FIG. 8; therefore, the same component elements are designated by the same reference numerals, and the description thereof will not be repeated here.

The media transmitting-receiving apparatus 110 depicted in FIG. 9 includes a data embedding unit 117 that embeds the sensor information segmented out by the sensing control unit 114 into the digital voice data to be encoded by the voice encoder 112 and transmitted to the sensor information gathering server 130, and the sensor information gathering server 130 includes a data retrieving unit 137 that retrieves the sensor information from the digital voice data received from the media transmitting-receiving apparatus 110.

Transmission security can be further enhanced by using voice hiding techniques when embedding the data by the data embedding unit 117 and retrieving the data by the data retrieving unit 137.

In a configuration such as the remote sensing system of FIG. 5 in which the supplemental information is extracted at the sensor information gathering server 30, a data embedding means and a data retrieving means, similar to the data embedding unit 117 and data retrieving unit 137 depicted in FIG. 9, may also be provided in the media transmitting-receiving apparatus 10 and the sensor information gathering server 30, respectively.

While the above embodiments have each illustrated an example in which the media signal or the voice signal is used as the guidance signal for providing guidance to the user about the detection timing of the respective sensors, it will be appreciated that the guidance means that can be used in the embodiment is not limited to such signals, but use can be made of various other signals, such as a signal that signals the sensor detection timing by the flashing of a light-emitting device, or a signal that activates an actuator to indicate the detection timing by providing a tactile feel.

While the present invention has been described in detail above with reference to the preferred embodiments, it should be understood by those skilled in the art that various modifications and changes can be made by anyone skilled in the art, and that all such modifications and changes that come within the range of the true spirit and purpose of the present invention fall within the scope of the present invention as defined by the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to showing of the superiority or inferiority of the invention. Although the embodiment(s) of the present inventions have been described in detail, it should be understood that the various changes, substitutions, and alterations could be made hereto without departing from the spirit and scope of the invention.

What is claimed is:

1. A sensor information gathering apparatus which receives sensor information at a location remote from a sensing apparatus which controls a sensing period of a sensor based on a prescribed guidance signal, said sensing apparatus including:
    a guidance signal analyzing unit which analyzes said prescribed guidance signal,
    a sensing control unit which determines said sensing period based on an analysis result from said guidance signal analyzing unit,
    a sensor information segmenting unit which segments out, from sensor information acquired by said sensor, a portion of said sensor information acquired during said sensing period,
    a guidance signal receiving unit which receives said prescribed guidance signal via a prescribed communication line, and
    a data transmitting unit which transmits said segmented sensor information to said sensor information gathering apparatus, and
    wherein said prescribed guidance signal contains prescribed supplemental information, and wherein
    said sensor information gathering apparatus comprising:
    a guidance signal transmitting unit which transmits said prescribed guidance signal to said sensing apparatus;
    a supplemental information extracting unit which extracts said supplemental information from said guidance signal transmitted by said guidance signal transmitting unit; and
    a sensor information managing unit which manages said segmented sensor information received from said sensing apparatus, by using a supplemental signal extracted from said guidance signal used for detection of said sensor information.

2. The sensor information gathering apparatus as claimed in claim 1, wherein
    said sensing apparatus is equipped with a plurality of said sensors, and
    said supplemental information extracting unit extracts, as said supplemental information, information that indicates which of said plurality of sensors is to be used for acquisition of said sensor information.

3. The sensor information gathering apparatus as claimed in claim 1, wherein said guidance signal is a media signal for providing guidance to a user about the sensing period of said sensor.

4. The sensor information gathering apparatus as claimed in claim 1, wherein said data transmitting unit transmits said segmented sensor information by embedding said segmented sensor information into a media signal transmitted by said sensing apparatus.

5. The sensor information gathering apparatus as claimed in claim 4, comprising a sensor information retrieving unit which retrieves said segmented sensor information embedded in the media signal received from said sensing apparatus.

6. The sensor information gathering apparatus as claimed in claim 5, wherein said sensing apparatus is equipped with a plurality of said sensors, and said supplemental information extracting unit extracts, as said supplemental information, information that indicates which of said plurality of sensors is to be used for acquisition of said sensor information.

7. A remote sensing method for transmitting sensor information to a remotely located sensor information gathering apparatus, said method comprising:
   analyzing a prescribed guidance signal which contains prescribed supplemental information;
   determining a sensing period of a sensor based on a result of said analyzing;
   segmenting out, from sensor information acquired by said sensor, a portion of said sensor information acquired during said sensing period;
   transmitting said segmented sensor information to said sensor information gathering apparatus;
   extracting said supplemental information from said guidance signal; and
   managing said sensor information by using a supplemental signal extracted from said guidance signal used for detection of said sensor information.

8. The remote sensing method as claimed in claim 7, wherein
   a plurality of said sensors are used, and
   information that indicates which of said plurality of sensors is to be used for acquisition of said sensor information is extracted as said supplemental information.

9. The remote sensing method as claimed in claim 7, wherein said guidance signal is a media signal for providing guidance to a user about the sensing period of said sensor.

10. The remote sensing method as claimed in claim 7, comprising receiving said prescribed guidance signal via a prescribed communication line.

11. The remote sensing method as claimed in claim 7, wherein said segmented sensor information is embedded into a media signal for transmission.

12. The remote sensing method as claimed in claim 11, comprising retrieving said segmented sensor information embedded in said media signal.

13. The remote sensing method as claimed in claim 12, wherein a plurality of said sensors are used, and
   information that indicates which of said plurality of sensors is to be used for acquisition of said sensor information is extracted as said supplemental information.

14. A sensor information gathering apparatus which receives sensor information at a location remote from a sensing apparatus,
   wherein said sensing apparatus, usable to control a sensing period of a sensor based on a prescribed guidance signal, including:
      at least one processor for:
         analyzing said prescribed guidance signal,
         determining said sensing period based on an analysis result from said analyzing,
         segmenting out, from sensor information acquired by said sensor, a portion of said sensor information acquired during said sensing period,
         receiving said prescribed guidance signal via a prescribed communication line, and
         transmitting said segmented sensor information to said sensor information gathering apparatus,
   wherein said prescribed guidance signal contains prescribed supplemental information, and wherein
   said sensor information gathering apparatus comprising:
      at least one processor for:
         transmitting said prescribed guidance signal to said sensing apparatus;
         extracting said supplemental information from said guidance signal transmitted by said transmitting said prescribed guidance signal; and
         managing said segmented sensor information received from said sensing apparatus, by using a supplemental signal extracted from said guidance signal used for detection of said sensor information.

15. The sensor information gathering apparatus as claimed in claim 14, wherein
   said sensing apparatus is equipped with a plurality of said sensors, and
   said extracting extracts, as said supplemental information, information that indicates which of said plurality of sensors is to be used for acquisition of said sensor information.

* * * * *